United States Patent Office 3,287,262
Patented Nov. 22, 1966

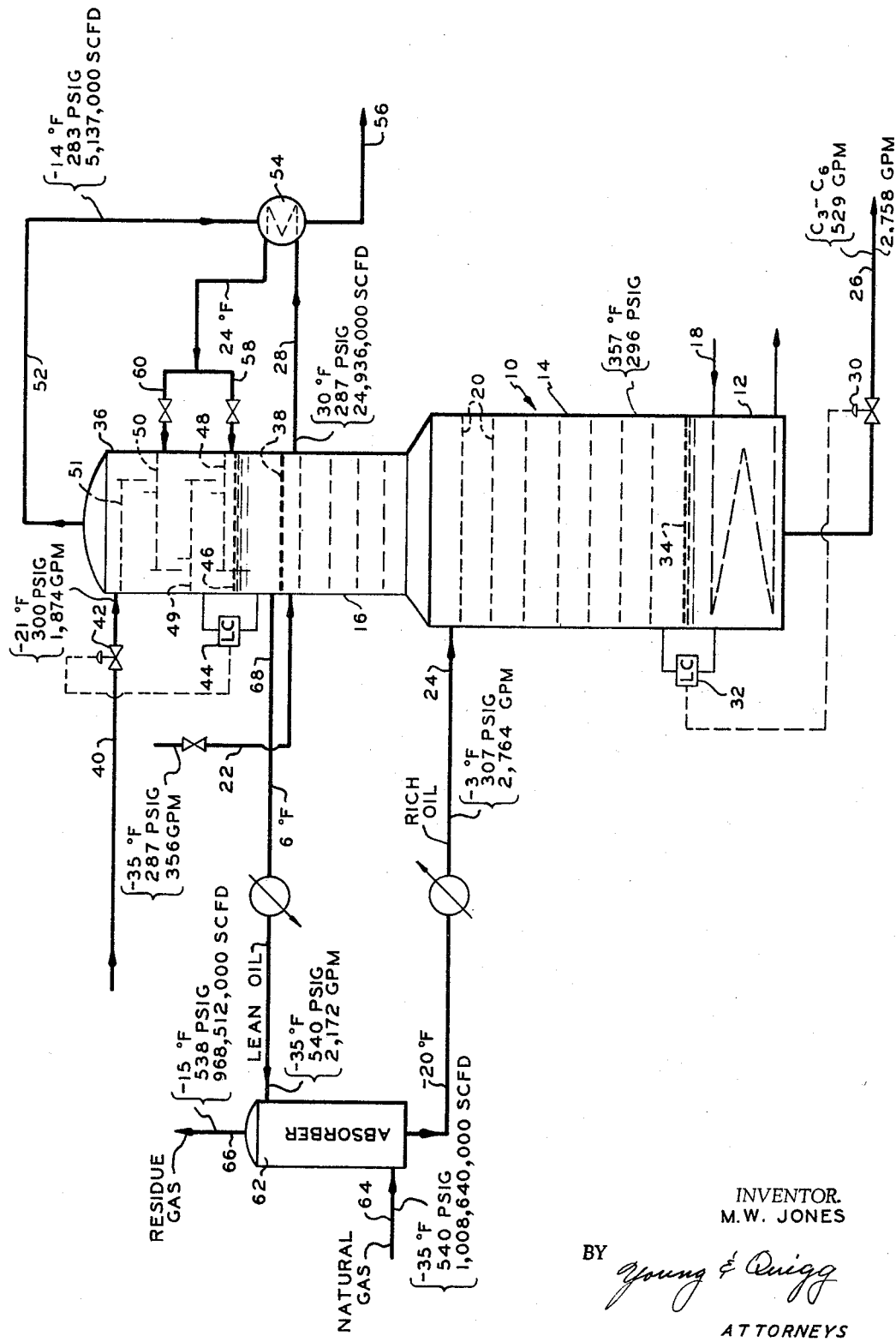

3,287,262
PROCESS AND APPARATUS FOR ABSORBING NATURAL GASOLINE
Maurice W. Jones, Bartlesville, Okla., assignor to Phillips Petroleum Company, a corporation of Delaware
Filed Jan. 14, 1964, Ser. No. 337,679
7 Claims. (Cl. 208—341)

This invention relates to an improved process and apparatus for contacting and recovering hydrocarbons.

A specific application of the invention is in a natural gasoline plant wherein raw or wet natural gas from the field is processed to recover therefrom gasoline-boiling range hydrocarbons, particularly $C_3$ to $C_6$ hydrocarbons. In a large gasoline plant, the throughput of gases and liquids is so great that considerable savings can be attained in improvements in processing capacity by improvements in equipment or apparatus. One of the big problems in such a gasoline plant is obtaining a large capacity for apparatus of minimum size in order to improve the economics of the process.

To illustrate the problem in such a gasoline plant, the natural gas is passed through one or more absorbers (in parallel if more than one) and there contacted with conventional lean oil absorbent so as to absorb most of the $C_3$–$C_6$ hydrocarbons and some of the ethane from the natural gas. The rich oil from the absorber(s) is passed to a de-ethanizer which comprises a tower having a lower section for de-ethanizing and a separate upper section for absorbing the ethane from the lower section in the lean oil for a feed to the absorbers. This upper section is termed a pre-saturator. This pre-saturator is provided with a series of perforate trays designed and arranged for contacting the gas to be absorbed and the lean oil while the lean oil is flowing over the trays and downwardly through the saturator with the gas flowing upwardly through the trays in contact with the lean oil. Heretofore all of the gas fed to the pre-saturator has been introduced thereto below the bottom tray and this gas rushes upwardly through the lean oil on the bottom and lower trays without effecting equilibrium between the gas and the absorbent. This invention is concerned with an improvement in the pre-saturator in such a combination and also broadly with apparatus for more efficiently efficiently effecting gas-liquid contacting.

Accordingly, an object of the invention is to provide an improved apparatus and process for effecting gas-liquid contacting. Another object is to provide an improved process and apparatus for absorbing a selected hydrocarbon gas in a liquid absorbent such as a lean oil. A further object is to provide improved heating efficiency in a gas-liquid absorber. It is also an object of the invention to provide an improved apparatus and process for recovering $C_2$ and higher hydrocarbons from natural gas. Other objects will become apparent upon consideration of the accompanying disclosure.

A broad aspect of the invention comprises an improvement in gas-liquid absorbent contacting wherein the gas to be absorbed is injected or introduced to the absorber in a plurality of streams, one below the bottom tray and at least one additional stream below at least one other tray above the bottom tray and below the top tray of the absorber. In combination with this improvement the unabsorbed gas is passed in indirect heat exchange with the feed gas to the absorber so as to improve the heating efficiency thereof. Natural gas is contacted with lean oil in one or more absorbers so as to recover the $C_3$–$C_6$ hydrocarbons and some of the ethane therefrom. The rich oil from the absorbers is passed through a de-ethanizer column to separate most of the ethane therefrom which is taken off as an overhead stream and passed in indirect heat exchange with the unabsorbed gases from a pre-saturator positioned, preferably, on top of the de-ethanizer for convenience and through which lean oil is passed as an absorbent to absorb the ethane. The lean oil, now pre-saturated, is fed to the absorbers as the lean oil feed thereto. The overhead ethane stream from the de-ethanizer, after indirect heat exchange with the unabsorbed gases from the pre-saturator is divided into a plurality of streams and introduced to the presaturator below different trays, the major portion of this ethane stream being introduced below the bottom tray with the remaining portion being introduced in one or more streams below one or more of the upper trays but below the top tray. This feature of introducing the gas to be absorbed into the absorber below the bottom tray and also below at least one upper tray below the top tray of the absorber substantially increases the capacity of the absorber. In the absorption of ethane in a lean oil feed to the absorbers in a natural gasoline plant, it has been found that the introduction of about ⅔ of the ethane below the bottom tray and the remaining ⅓ of the ethane below the third tray from the bottom increases the capacity of the absorber so that about 25 percent more gas can be absorbed in the lean oil than when all of the feed is passed into the absorber below the bottom tray.

A more complete understanding of the invention may be had by reference to the accompanying schematic drawing which shows an arrangement of apparatus and flow for effecting the invention.

Referring to the drawing, a de-ethanizer 10 comprises a kettle section 12, a stripping section 14, and an absorbing section 16. Section 12 is provided with any suitable means for reboiling such as steam coil 18. Section 14 is provided with conventional trays 20 as is also section 16. Although reboiling is effected in the arrangement shown by means of steam coil 18, it is feasible to effect the desired amount of heating in the lower portion of the de-ethanizer including sections 12 and 14 by withdrawing liquid from several trays at different levels in separate streams, passing these separate streams through heat exchangers to heat same, and returning the heated streams at suitable levels to the de-ethanizer.

Lean oil is passed into an upper level of section 16 above the top tray therein through line 22 so that it flows downwardly over the trays through this section in countercurrent contact with the vapor stream so as to absorb most of the $C_3$ and heavier hydrocarbons therefrom. De-ethanizer 10 is also provided with a feed line 24 for rich oil and a kettle product withdrawal line 26 and a vapor withdrawal line 28. Line 26 is provided with a motor valve 30 which is responsive to a liquid level controller 32 on de-ethanizer 10. This arrangement maintains a desired liquid level such as illustrated by line 34 in section 12 above steam coil 18.

Positioned on top of de-ethanizer 10 is a pre-saturator 36 which is separated from de-ethanizer 10 by an impervious plate 38. Line 40 provides for inlet of lean oil near the top of pre-saturator 36 and is provided with a motor valve 42 which is responsive to liquid level controller 44, arranged to maintain a suitable liquid level 46 in the bottom of the pre-saturator. The pre-saturator is provided with the usual trays found in any gas-liquid absorber or contactor. These trays, designated 48, 49, 50, and 51, are perforate and have cooperating baffles which force the gas to be absorbed up through the perforations or passageways in the trays and through the liquid maintained thereon. Vapor take-off line 52 passes through heat exchanger 54 in indirect heat exchange with gas in line 28 before passing to suitable disposal through line 56. The stream in line 28 is divided and passed into the absorber or pre-saturator through lines 58 and 60. Line 58 enters the vessel below bottom tray 48 and line 60 enters below tray 50. Even greater efficiency can be obtained by introducing the gas to be absorbed below additional trays in the arrangement.

Absorber 62 is a conventional lean oil absorber provided with trays, not shown, and with a feed inlet 64 for natural gas, a residue gas take-off line 66 and a rich oil take-off line 24 which leads into the de-ethanizer. Line 68 withdraws pre-saturated lean oil from the bottom of pre-saturator 36 and feeds this stream into the upper section of absorber 62. Absorber 62 is illustrative of a series of absorbers generally used in combination with a single large capacity de-ethanizer. The operation of these absorbers in the recovery of gasoline-boiling range liquid from raw natural gas is conventional and needs no discussion. This is also true of de-ethanizer 10. Details of the operation of these pieces of equipment will therefore be omitted.

The drawing provides certain data referring to the various flow lines and equipment illustrating operation in a large gasoline plant presently in use in the extraction of natural gasoline from raw natural gas. More than one billion standard cubic feet per day (s.c.f.d.) of natural gas is fed through line 64 and almost a billion standard cubic feet per day of residue gas are recovered from the four absorbers through which the natural gas is passed. The recovery of $C_3$–$C_6$ hydrocarbons (gasoline boiling range) from the rich oil in line 26 is 529 gallons per minute. This amounts to about 761,760 gallons of natural gasoline recovered per day.

The ethane flow in line 28 is 24,936,000 s.c.f.d. and this is divided into two streams, ⅔ of the flow being passed into the pre-saturator through line 58 below the bottom tray and the remaining ⅓ being passed through line 60 into the vessel below the second tray above the bottom tray. All of this gas is absorbed excepting 5,137,000 s.c.f.d. which is at a temperature of −14° F. and is heat exchanged with the ethane in line 28 passing through heat exchanger 54, the ethane being at an inlet temperature of 30° F. and an exit temperature of +24° F. Substantial economy is effected in this heat exchange step whereas, heretofore, the ethane has been passed directly into the bottom of the saturator without cooling thereof with the overhead effluent.

While the improvement in the absorber structure and in the process steps used in connection with the absorber have been illustrated in an application to the recovery of ethane from a de-ethanizer, these aspects of the invention are applicable broadly to any gas-liquid contacting apparatus or absorbers.

Certain modification of the invention will become apparent to those skilled in the art and the illustrative details disclosed are not to be construed as imposing unnecessary limitations on the invention.

I claim:
1. In a process for absorbing natural gasoline from raw natural gas comprising the steps of:
   (1) contacting said raw natural gas with pre-saturated lean oil to separately recover a rich oil containing a natural gasoline fraction and a residue gas;
   (2) passing the rich oil of step (1) to a de-ethanizer and separately recovering an ethane-rich stream and a de-ethanized rich oil;
   (3) passing the ethane-rich stream of step (2) to a pre-saturator;
   (4) contacting lean oil with said ethane-rich stream in the pre-saturator of step (3) to separately recover an unabsorbed light gas stream and a pre-saturated lean oil stream; and
   (5) passing the pre-saturated lean oil stream of step (4) to step (1) as lean oil feed thereto; the improvement comprising the steps of:
      (a) passing the ethane-rich stream of step (2) in indirect heat exchange with the unabsorbed light gas stream from step (4) to cool said ethane-rich stream before passing same to step (4); and
      (b) passing the cooled ethane-rich stream of step (a) into said pre-saturator at different tray levels therein.

2. The improvement of claim 1 wherein from about 0.5 to 0.7 of the ethane-rich stream of step (a) is passed into said pre-saturator below the bottom tray and the remainder thereof is passed thereinto above the bottom tray and below the top tray.

3. In a process for absorbing natural gasoline from raw natural gas comprising the steps of:
   (1) contacting said raw natural gas with pre-saturated lean oil to separately recover a rich oil containing a natural gasoline fraction and a residue gas;
   (2) passing the rich oil of step (1) to a de-ethanizer and separately recovering an ethane-rich stream and a de-ethanized rich oil;
   (3) passing the ethane-rich stream of step (2) to a pre-saturator;
   (4) contacting lean oil with said ethane-rich stream in the pre-saturator of step (3) to separately recover an unabsorbed light gas stream and pre-saturated lean oil stream; and
   (5) passing the pre-saturated lean oil stream of step (4) to step (1) as lean oil feed thereto; the improvement comprising the steps of:
      (a) dividing the ethane-rich stream from step (2) into a major stream and a substantial minor stream;
      (b) passing the major stream of step (a) into the pre-saturator below the bottom tray; and
      (c) passing the minor stream of step (a) into said pre-saturator between trays above the bottom tray.

4. In a process for presaturating a lean oil with at least one component of a mixed hydrocarbon gas stream in an absorber provided with a series of trays wherein said lean oil is introduced into an upper section of said absorber, said oil flows over said trays and downwardly to a liquid mass of oil below the bottom tray, and said gas stream containing said at least one component to be absorbed passes upwardly thru said trays in contact with the descending oil, the improvement comprising passing a substantial portion of said mixed hydrocarbon gas stream into said absorber below the bottom tray and passing the remaining portion into said absorber above the bottom tray and below the top tray thereof.

5. The process of claim 4 wherein a major portion of said stream of gas is passed into said absorber below the bottom tray and a substantial minor portion is passed thereto above the bottom tray and below the top tray.

6. Apparatus comprising in combination:
   (1) a fractionation tower having a series of trays therein, an inlet for lean oil in an upper section thereof, an inlet for liquid feed in an intermediate section thereof, an outlet for kettle product in the bottom section thereof, an outlet for a vapor fraction in an upper section thereof, and means for heating liquid in the bottom section thereof;
   (2) an absorber comprising an upright vessel having a series of transverse perforate trays therein with means for flowing liquid downwardly therethru and over said trays while passing gas upwardly therethru in contact with said liquid;

(3) an inlet for lean liquid in an upper section of said absorber and an outlet for rich liquid in a lower section of said vessel below the bottom tray;

(4) separate inlets for gas in said absorber, one below the bottom tray thereof and at least one inlet below the top tray thereof and above the bottom tray thereof;

(5) conduit means connecting the outlet for vapor of (1) with the separate inlets of (4); and (6) an outlet for unabsorbed gas in said vessel above the top tray thereof.

7. The apparatus of claim 6 including:

(7) a line leading from the vapor outlet of (6); and (8) an indirect heat exchange in the line of (7), the conduit means of (5) passing thru said heat-exchanger.

References Cited by the Examiner
UNITED STATES PATENTS

| | | | |
|---|---|---|---|
| 2,032,666 | 3/1936 | Roberts | 208—353 |
| 2,596,785 | 5/1952 | Nelly et al. | 62—17 |
| 2,600,133 | 6/1952 | Simms | 208—341 |

DELBERT E. GANTZ, *Primary Examiner.*

H. LEVINE, *Assistant Examiner.*